United States Patent
Decker et al.

(10) Patent No.: US 7,553,447 B2
(45) Date of Patent: Jun. 30, 2009

(54) METHOD OF OZONE INJECTION INTO SEWAGE FORCED MAIN

(75) Inventors: R. Scott Decker, Carthage, MO (US); Dale A. Eltiste, Overland Park, KS (US)

(73) Assignee: Adaptive Ozone Systems, LLC

( * ) Notice: Subject to any disclaimer, the term of this patent is extended or adjusted under 35 U.S.C. 154(b) by 0 days.

(21) Appl. No.: 11/999,352

(22) Filed: Dec. 5, 2007

(65) Prior Publication Data

US 2008/0213126 A1   Sep. 4, 2008

Related U.S. Application Data

(63) Continuation-in-part of application No. 11/518,829, filed on Sep. 11, 2006.

(60) Provisional application No. 60/450,457, filed on Feb. 26, 2003.

(51) Int. Cl.
*A61L 2/20* (2006.01)

(52) U.S. Cl. .............................. 422/28; 422/5; 210/758; 210/760

(58) Field of Classification Search .................... 422/5, 422/120, 123, 28; 210/218, 758, 760
See application file for complete search history.

(56) References Cited

U.S. PATENT DOCUMENTS

| | | | | |
|---|---|---|---|---|
| 3,680,704 | A * | 8/1972 | Schaefer | 210/218 |
| 4,256,574 | A * | 3/1981 | Bhargava | 210/614 |
| 6,056,885 | A * | 5/2000 | Wasinger | 210/760 |
| 6,811,705 | B2 * | 11/2004 | Puetter et al. | 210/703 |

* cited by examiner

*Primary Examiner*—Sean E Conley
(74) *Attorney, Agent, or Firm*—Polsinelli Shughart, P.C.; Richard P. Stitt (57) ABSTRACT

An apparatus and method are provided for introducing high-concentration, high-pressure oxygen gas with or without high-pressure ozone gas into pumped sewage mains, also known as force sewage mains, a portion of the pumped sewage is diverted from the force sewage main for addition of the high-concentration, high-pressure oxygen gas with or without high-pressure ozone gas thereto and for mixing of the gases with the sewage following by reintroduction of the gas-containing sewage into the force sewage main to accomplish the elimination of hydrogen sulfide gas odor from sewage and sewer lines.

8 Claims, 5 Drawing Sheets

METHOD OF OZONE INJECTION INTO SEWAGE FORCED MAIN

CROSS REFERENCE TO RELATED APPLICATION

This is a continuation-in-part of copending application Ser. No. 11/518,829 filed Sep. 11, 2006, the specification of which is incorporated herein by reference and which is a continuation-in-part of provisional Application Ser. No. 60/450,457 filed on Feb. 26, 2003.

STATEMENT REGARDING FEDERALLY SPONSORED RESEARCH

Not relevant.

FIELD OF THE INVENTION

The present invention relates to the elimination of hydrogen sulfide ($H_2S$) gas odor from sewage and sewer lines. In particular, the present invention provides a method of adding ozone gas and oxygen gas to sewage lines through which the sewage is actively pumped. An apparatus for achieving the addition of the ozone gas and oxygen gas to the pumped sewage mains, and which also are known as force mains or forced sewage mains, also is provided.

BACKGROUND OF THE INVENTION

Lift stations are used to help transport liquid wastewater from homes and businesses across the city to a treatment plant for processing and cleaning. Sewage from homes or buildings travels by gravity through sloped primary sewage pipes to a main collection well or holding pit. Such a well or holding pit, known as a wet well, is part of a lift station. Once the sewage arrives at the lift station a sewage pump actively pushes the sewage from the wet well to a force main for delivery to a treatment facility. The pump also may send the sewage to a gravity flow pipe positioned at a higher level than the wet well of the lift station. Lift stations are necessary as sewage cannot flow passively uphill. At some point the sewage must be either raised to a higher level for continued gravity flow or the sewage must be forcefully pumped through pipes to a higher level destination.

A frequent and significant problem with lift stations is odor generation from sewer gas. The presence of sewer gas raises concerns for sewer personnel exposed to accumulated gases. Also, sewer gases left to accumulate in air-tight environments can create additional toxic gases and underground potential for explosion, stagnation, and dead space in lines. Aeration is an option to reduce odor. Many odors accumulate because of oxygen-deficient environments. Sometimes chemicals such as sodium nitrate are added to increase oxygen content in the water to provide the bacteria an additional oxygen source when the oxygen in the sewage is exhausted. This prevents $H_2S$ formation from anaerobic bacteria. In some cases, pine scented blocks also have been added to neutralize the obnoxious odors.

A main characteristic of sewage or wastewater is its highly disagreeable odor. Many organic and inorganic compounds contribute to the formation of this odor. But mostly inorganic and organic sulfur compounds are responsible for the odor. The principal agent among the sulfur compounds is hydrogen sulfide. Hydrogen sulfide in sewage or wastewater creates a public nuisance because of its highly disagreeable odor at levels as low as 0.01 parts per million (ppm) in the atmosphere. Breathing by humans of air containing as low as 10 ppm of hydrogen sulfide for a period of time can prove fatal; such accumulations are likely to occur in covered or domed clarifiers or settling tanks in water treatment plants, or in manholes or wet wells in sewage systems. Besides odor, hydrogen sulfide formation results in heavy corrosion of metal and concrete sewer lines, concrete and metal structures, and metal equipment and machinery. The corrosion is greatly reduced when the formation of hydrogen sulfide can be reduced in sewage. The presence of hydrogen sulfide also is detrimental to the growth of microorganisms and other biological active substances. The microorganisms and biological active substances can not properly metabolize in the presence of hydrogen sulfide. Thus the efficiency of purification of sewage or wastewater is decreased.

The condition under which hydrogen sulfide is formed in sewage or wastewater is called septic. In septic sewer conditions the microorganisms present turn black and seems lifeless. Until this condition is reversed, sewage or wastewater can not be efficiently purified by biological active substances. Any added biologically active substances will not function properly in septic conditions and will fail to remove the nutrients properly from the sources in sewage.

Although, many treatments to control formation and regeneration of hydrogen sulfide in sewage or wastewater have been tried, none has been uniformly satisfactory or successful in both gravity systems and force main systems. Among those treatments used have been aeration, chlorination, ozonation, lime, sodium nitrate, activated carbon filtration, odor masking, hydrogen peroxide oxidation, and iron salts. However, the high cost and frequency and sometimes difficulty of adding these materials to a force main in particular make these options or their methods of addition to a force main unsatisfactory.

Therefore, it would be beneficial in terms of cost and efficiency if a means of treating force sewer mains were available that was inexpensive, required only limited operator involvement, did not require the addition of manufactured chemical products to the sewage, and would rid the sewage force mains of the hydrogen sulfide producing bacteria.

SUMMARY OF THE INVENTION

A method and apparatus is provided for adding oxygen and/or an ozone and high-concentration oxygen gas mixture, into pressurized environments such as sewer force mains and other applications in which the environment in need of additional oxidative material is under pressure. The present invention provides an apparatus and method for providing high-pressure ozone in a carrier gas of high pressure, high-concentration oxygen gas to a pressurized environment while avoiding the problem of destroying the ozone gas as a result of using a compressor to increase the pressure of the ozone gas or a gas containing ozone gas. One embodiment described allows the addition of ozone and high-concentration oxygen gas to a pressurized sewer line, known as a force main or force sewer main, by redirecting a stream or portion of the sewage into mixing chamber that is outside of the sewer force main. In the mixing chamber the sewage portion is mixed with a diffused, high-pressure gas comprised of either high-concentration oxygen gas or a mixture of ozone and high-concentration oxygen gas. The sewage portion having the high-concentration oxygen gas dissolved therein, or a mixture of ozone and high-concentration oxygen gas dissolved therein is then reintroduced into the sewer force main to eliminate the sources of production of hydrogen sulfide within the sewer force main and its associated noxious odor.

The apparatus used to accomplish the introduction of the high-pressure, high-concentration oxygen gas with or without ozone gas, to the sewage force main is comprised of a series of low horsepower air compressors which introduce compressed air into an oxygen concentrator or generator. The multiple oxygen concentrators then feed high-concentration oxygen gas to a manifold which sends the stream of low-pressure, high-concentration oxygen gas to a pressure booster. The pressure booster is a one-third to one-half horsepower compressor which compresses the high-concentration oxygen gas up to a pressure of approximately 160 pounds per square inch maximum. The high-pressure, high-concentration oxygen gas is then passed through a high-pressure ozone generator for selectable addition of ozone to the gas stream. The gas stream is then introduced into the mixing chamber through a diffuser nozzle to provide the high-pressure, high-concentration oxygen gas and ozone gas (if selected) into the pressurized sewage mass.

The foregoing and other objects are intended to be illustrative of the invention and are not meant in a limiting sense. Many possible embodiments of the invention may be made and will be readily evident upon a study of the following specification and accompanying drawings comprising a part thereof. Various features and subcombinations of invention may be employed without reference to other features and subcombinations. Other objects and advantages of this invention will become apparent from the following description taken in connection with the accompanying drawings, wherein is set forth by way of illustration and example, an embodiment of this invention.

DESCRIPTION OF THE DRAWINGS

Preferred embodiments of the invention, illustrative of the best modes in which the applicant has contemplated applying the principles, are set forth in the following description and are shown in the drawings and are particularly and distinctly pointed out and set forth in the appended claims.

OZONE INJECTION INTO SEWAGE FORCED MAIN

Figure 1:
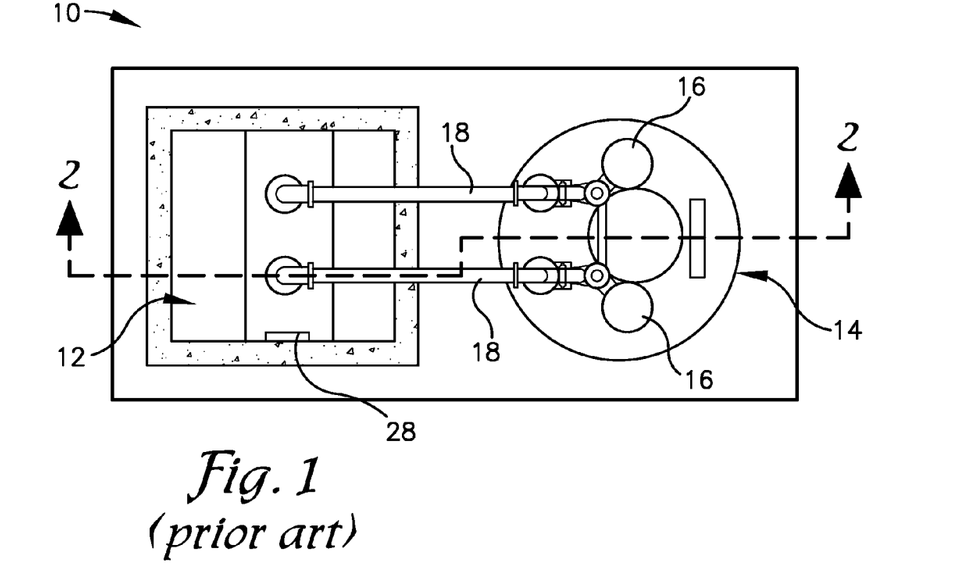
FIG. 1 shows a plan view of a typical sewage lift station having a separated wet well and dry well.

Now referring to FIG. 1, a plan view of a typical prior art wet well/dry well lift station 10 is shown. Lift station 10 is comprised of a wet well 12 and a dry well 14. A sewage inlet pipe 28 delivers sewage into wet well 12. The dry well 14 is provided with pumps 16 which pull liquid sewage from wet well 12 into intake line 18. Dry well pump 16 then pushes the raw sewage sucked in by intake line 18 into force main 20 (FIG. 2) thereby sending the raw sewage to another location.

Figure 2:
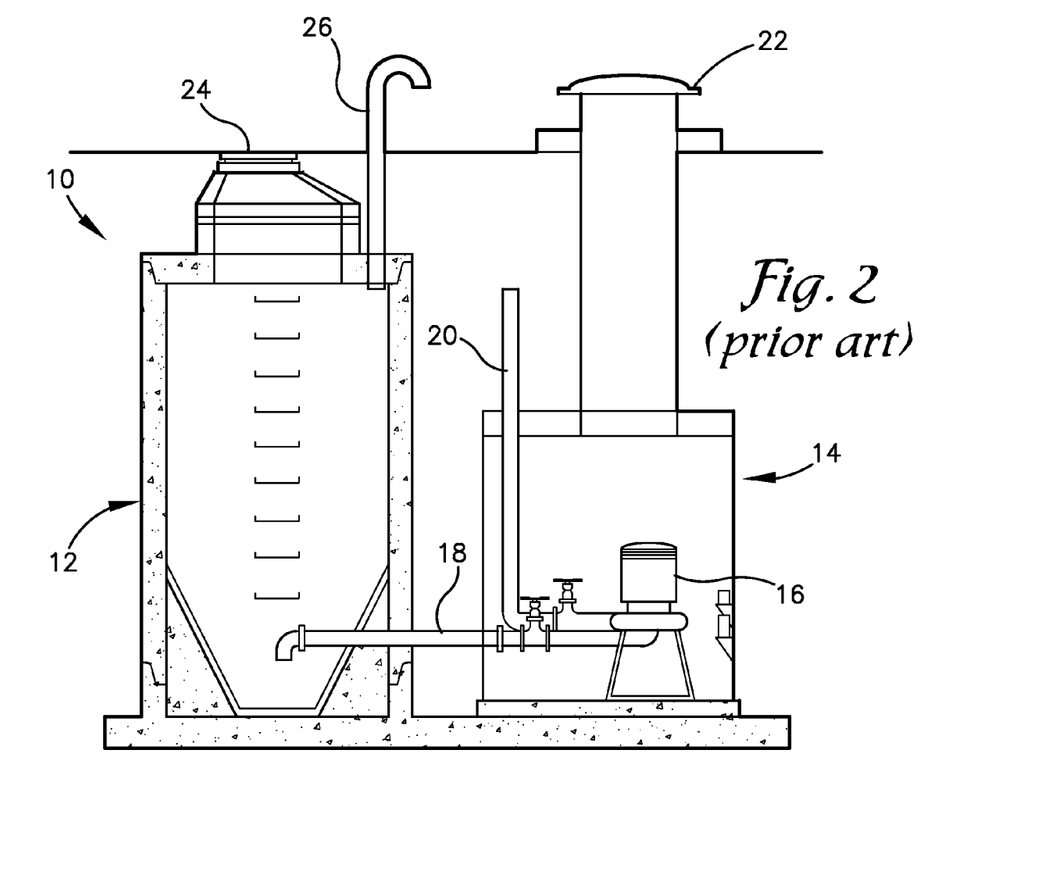
FIG. 2 is a cross-section elevation view taken along line 2-2 of FIG. 1 and showing the arrangement of a pump apparatus within the lift station.

In FIG. 2, the structures of FIG. 1 are shown in elevation view as a cross section taken along line 2-2 of FIG. 1. Dry well 14 is provided with dry well access 22 for servicing of pumps 16 contained within dry well 14. Manhole cover 24 is provided for access to wet well 12. Vent 26 allows degassing of wet well 12.

Figure 3:
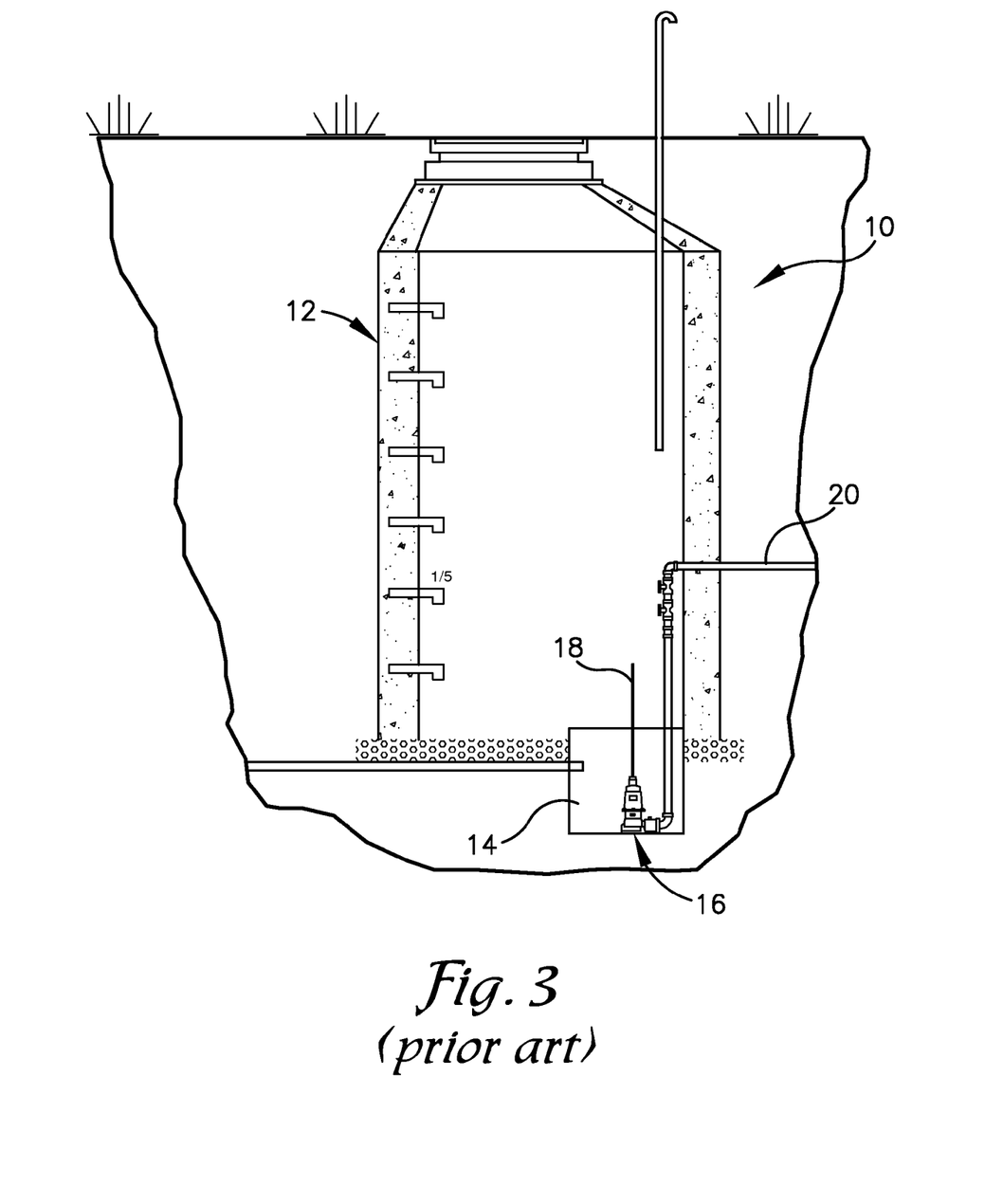
FIG. 3 is a cross-section elevation of an alternate embodiment of a lift station having the dry well incorporated into the wet well of the lift station.

Referring now to FIG. 3, an alternate embodiment of a wet well/dry well 10 is shown. In the embodiment of FIG. 3, a majority of the area is devoted to wet well 12 and a small enclosed dry well 14 is located at the base of wet well 12. Sewage leaves wet well 12 by being pulled into pump 16 via inlet pipe 18 and the sewage is then pumped into force main 20.

Figure 4:
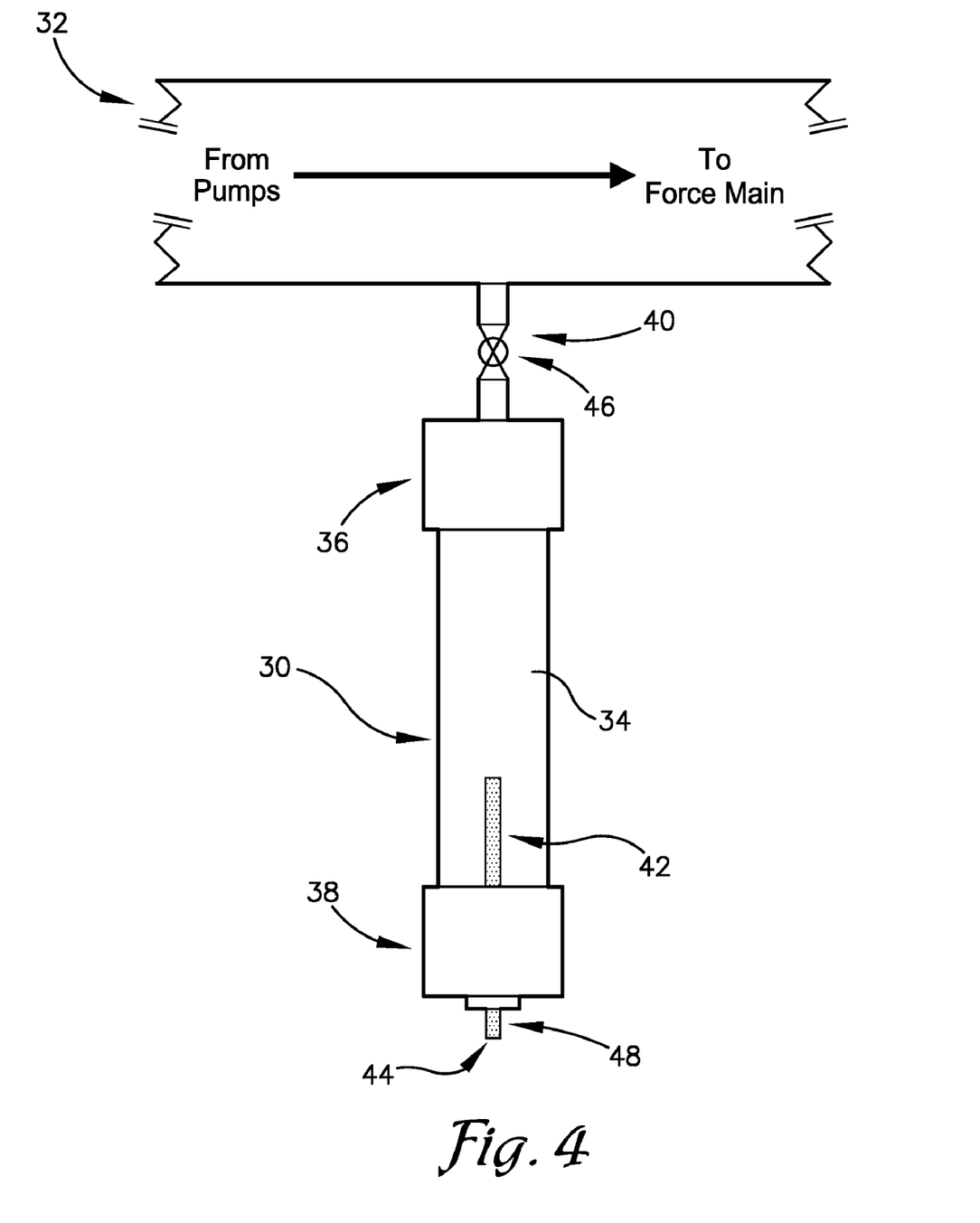
FIG. 4 is a schematic diagram of the arrangement of a sewage force main and the mixing chamber for the mixing of ozone supplied to the mixing chamber with sewage supplied to the mixing chamber from the force main.

Referring now to FIG. 4, the diffuser 42 and the mixing chamber 30 unit of the present embodiment will be described. In FIG. 4, mixing chamber 30 is comprised of reservoir 34 having first end cap 36 and second end cap 38 attached to either end of reservoir 34. Mixing chamber 30 is connected to force main 32 by diversion line or take-off or nipple 40. Take-off 40 can be provided with valve 46 to regulate the flow of sewage in and out of mixing chamber 30. As shown in FIG. 4, take-off or nipple or diversion line 40 is connected to first end cap 36 of mixing chamber 30. The high-pressure, high-concentration oxygen, with or without ozone, is introduced into mixing chamber 30 by diffuser 42 which is connected to second end cap 38. Diffuser 42 also is connected to gas inlet 44 having a check valve 48 provided to prevent backflow of liquid sewage material out of mixing chamber 30 and into gas inlet 44. It will be appreciated that gas inlet 44 is connected to a gas supply line such as line 111 of FIG. 6 which is connected to the gas supply equipment shown in FIG. 6 and described hereinafter.

It also should be appreciated that mixing chamber 30 is not inside or inserted into force main 30, but is exterior to force main 30. This exteriorization of mixing chamber 30 is critical to proper operation of the present device and to the continued proper operation of the force main 32. If mixing chamber 30 or diffuser 42 is inside of, or inserted into, or projecting into, force main 32, either device will contact and hold-up solid refuse that is present in the sewage. Over time this will cause obstruction of force main 32. Since typical force mains 32 already are equipped with holes or openings of approximately one inch in diameter that are used for the introduction of chemicals into the sewage it usually is not necessary to modify the force main 32 to connect the present embodiments. Rather, the existing openings can be used for attachment of an embodiment of the present apparatus.

In the unlikely event that diffuser 42 of mixing chamber 30 does become obstructed by particulates or coated with organic material, the diffuser can easily be cleaned or changed-out for a clean diffuser 42. This is accomplished by unscrewing the diffuser 42 from second end cap 38 cap of the apparatus and cleaning the diffuser 42 or by substituting a clean diffuser 42 for the fouled diffuser 42. It will be appreciated that were the diffuser 42 directly inserted into the force main 32 that such a cleaning operation would not be possible. Were the diffuser 42 projecting into the force main 32 it would be necessary to drain the force main, at great expense, to repair the diffuser 42. Also, such repairs would be required to be scheduled at time at which the force main 32 was not operational. This required either scheduling the repair for a time when the dry well 14 pump 16 is not operating or shutting down the operation of the force main to allow the repairs to be made.

Alternatively, in one embodiment described herein, ozone is periodically delivered to diffuser 42 to allow the ozone to clean diffuser 42 as it becomes fouled by sewage or bacteria. It will be appreciated that this cleaning of diffuser 42 with ozone is an operation which is separate and apart from the general provision of ozone via the gas stream to increase the amount of ozone and oxygen dissolved within the sewage within mixing chamber 30.

Figure 5:
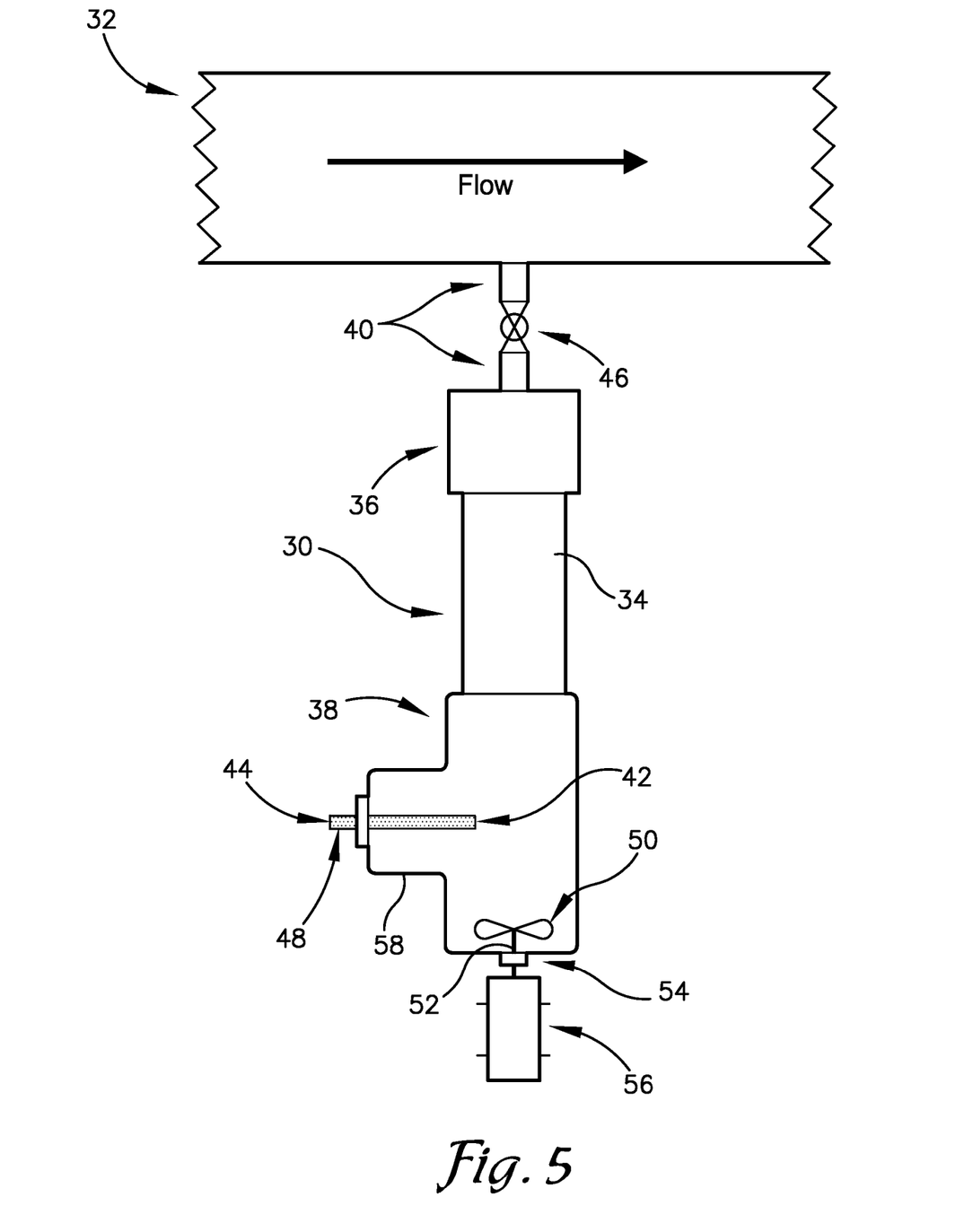
FIG. 5 is a schematic diagram of the arrangement of a sewage force main and the mixing chamber similar to the device show in FIG. 4, and showing the addition of a mixing paddle for mixing the sewage portion with the gas supplied by the diffuser to the mixing chamber.

Referring now to FIG. 5, an alternate embodiment of mixing chamber 30 is shown. In the embodiment of FIG. 5, mixing chamber 30 is provided with a paddle 50 inserted through the bottom of second end cap 38. In this embodiment second end cap 38 is enlarged as compared to the end cap of the embodiment of FIG. 4. Because of this enlargement end cap 38 serves to provide a substantial portion of the volume or capacity of mixing chamber 30. Paddle 50 is attached to shaft 52 which passes through seal 54 of end cap 38 to connect with motor 56 which rotates shaft 52 and paddle 50 as required. Paddle 50 serves to create a vortex within mixing chamber 30 to more efficiently mix the high-concentration oxygen and ozone (when present) with the sewage entering mixing chamber 30 from force main 32. In the embodiment shown in FIG. 5, diffuser 42 has been mounted in a side arm 58 of second end cap 38 to reduce interference with the mixing motion provided by paddle 50. It has been found that the use of stirring or mixing as is provided by paddle 50 greatly assists in dissolving of the gases exiting diffuser 42 into the sewage mixture contained within mixing chamber 30 and into the sewage mixture in force main 32.

Figure 6:
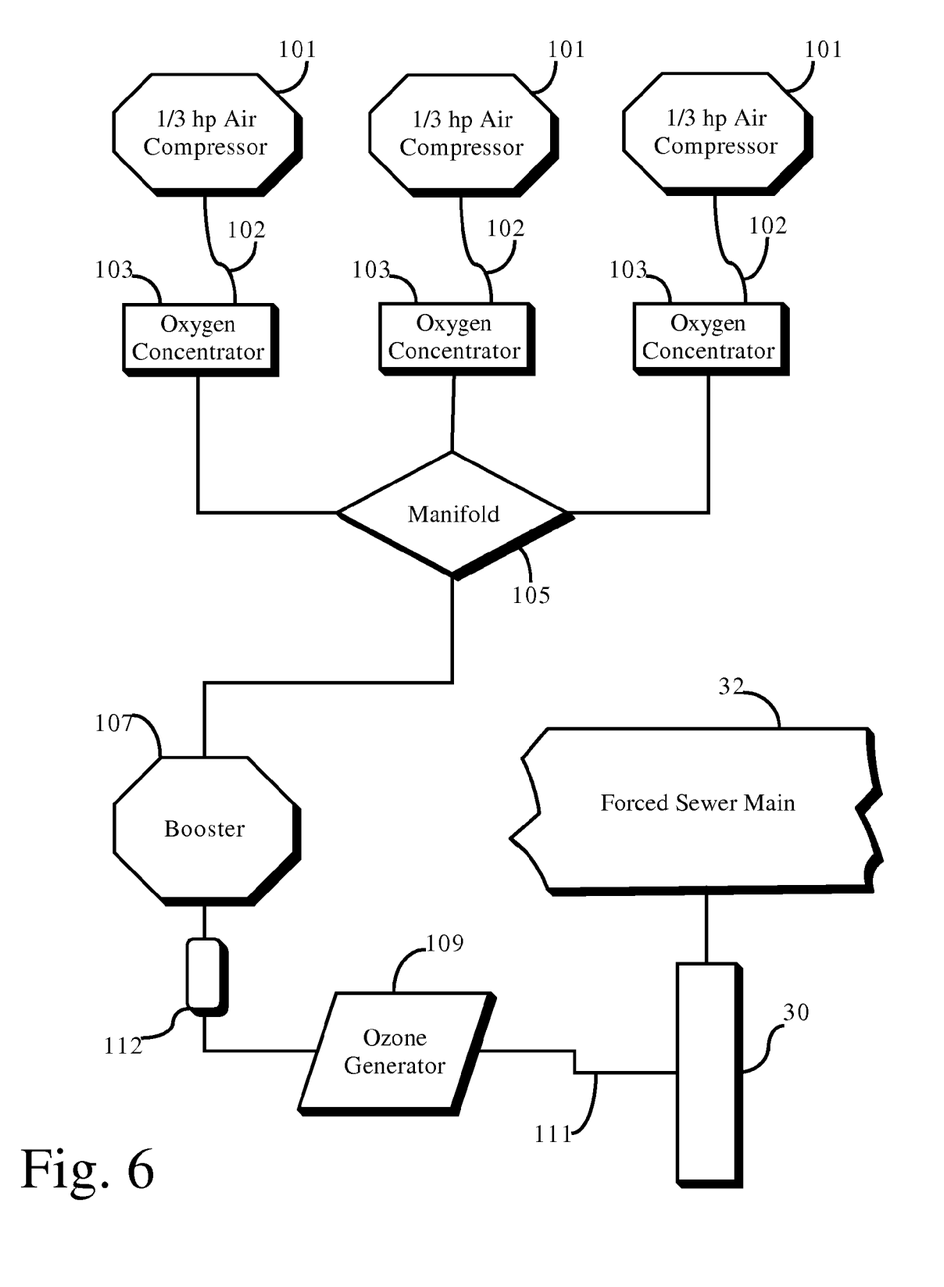
FIG. 6 is a schematic diagram of the configuration of equipment used to produce high pressure, high concentration oxygen and ozone gas for use in the elimination of hydrogen sulfide from forced sewer mains as described herein.

Referring now to FIG. 6, the apparatus employed in the present method will be described. In general, the apparatus is comprised of several low horsepower air compressors 101 with a gas line 102 connecting each to an oxygen concentrator 103 of the pressure swing type. The high-concentration oxygen output from the oxygen concentrators 103 is pooled at a manifold 105 and then flows via manifold 105 into a pressure booster 107. The pressure booster then delivers high-pressure, high-concentration oxygen gas to a high-pressure ozone generator 109. The ozone generator 109 is selectably operated to produce ozone which is comingled with the high-pressure, high-concentration oxygen passing through the ozone generation apparatus 109. This arrangement provides a gas stream of high-pressure, high-concentration oxygen that may or may not contain ozone depending on the determined need for addition of ozone to the sewage pipe in response to the analysis of hydrogen sulfide presence in the forced main sewage line 32. The gas steam delivers high-pressure, high-concentration oxygen at a pressure of between up to 160 pounds per square inch (psi) having an oxygen concentration of between 80% and 97% oxygen by weight to diffuser 42 of mixing chamber 30.

As a means of reducing equipment costs while yet producing a supply of high-pressure, high-concentration oxygen, with or without ozone, a system that initially relies on low-cost, low horsepower compressors 101 is used. This provides the required pressurized volume of air to a series of oxygen concentrators 103 for generation of quantities of low-pressure, high-concentration oxygen. After generation of the high-concentration oxygen a pressure booster 107 is then used to raise the pressure of the high-concentration oxygen up to a maximum of 165 pounds per square inch. It will be appreciated that, as previously described, the ozone generator operates intermittently depending upon the amount of hydrogen sulfide detected within the forced sewer main. It will further be appreciated that this arrangement of passing high-pressure, high-concentration oxygen through the ozone generator to add ozone to the pre-existing stream of high-pressure, high-concentration oxygen avoids the debilities of previous devices. Previous devices, generally, would compress only ozone gas up to a high-pressure. The use of air compressors directly on the ozone gas would destroy a substantial portion of the ozone through the heat of the mechanical operation of the compressor on the ozone gas. It will be appreciated that the present invention avoids this destructive compression of the generated ozone gas by adding the ozone gas into the previously created high-pressure, high-concentration oxygen stream.

Still referring to FIG. 6, the specific construction and operation of the air compression and high-pressure, high-concentration oxygen and ozone generation system will be described. Ambient air is compressed using a series of approximately one-third to one horsepower (Hp) air compressors 101. The compressed air then is fed into oxygen concentrators or oxygen generators 103 which operate on the pressure swing methodology that is well known in the art. Oxygen generator 103 provide a gas output having a concentration of oxygen that is in the range of approximately 80% to 95% oxygen by weight. This output gas of the oxygen concentrators 103 is at a pressure of approximately seven (7) to nine (9) pounds per square inch (psi). The produced high-concentration oxygen from the several devices is then combined at manifold 105 and passed onto pressure booster 107. Booster 107 compresses the high-concentration oxygen to a pressure of up to a maximum of 165 pounds per square inch. In a preferred embodiment booster 107 is a one-third to one-half horsepower compressor which, as previously mentioned, is small and compact and requires very little energy consumption. Compressors up to about 1 horsepower are suitable for use and are in keeping with the low cost goals of the embodiment. It will be appreciated that the increase in pressure of the high-concentration oxygen from approximately seven to nine psi up to a maximum of 165 psi is necessary to overcome the pressure within the forced sewer main to allow the introduction of the high-concentration oxygen and/or high-concentration oxygen and ozone mixture into the mixing chamber via the diffuser.

As previously described, depending on the state of the hydrogen sulfide production in forced sewer main 32, ozone generator 109 may or may not be operated at any particular time during the addition of high-concentration oxygen to mixing chamber 30. If more than zero parts per million of hydrogen sulfide is detected in forced sewer main 32, the ozone generator 109 will be operated and ozone added to the high-pressure, high-concentration oxygen gas stream. After passing through ozone generator 109, the high-concentration, high-pressure oxygen gas stream (with or without ozone) is passed into diffuser 42 of mixing chamber 30.

Again Referring to FIG. 6, the oxygen concentrators or oxygen generators 103 employed are pressure swing oxygen generators. A suitable pressure swing generator is the SeQual ATF® Advanced Technology Fractionator manufactured by SeQual Technologies, Inc., of San Diego, Calif. The SeQual ATF is comprised of an air compressor that relies on ambient air to supply to an oxygen concentrator of the pressure swing type. The device removes both nitrogen and moisture from the ambient air and provides a gas stream of 90% to 94% oxygen having a dew point of about 100° F. The output pressure of the device is in the range of 7 psi to 10 psi.

An oxygen purity monitor and controller is connected to the output line of the SeQual device. The monitor provides a read out of the oxygen ($O_2$) concentration output of the SeQual device. If the oxygen concentration is below 89% for a time of more than five (5) minutes, an alarm is activated. Upon activation of the alarm a warning light is illuminated and a signal is sent to a remote monitoring station and the system is shut down to avoid damage to the oxygen and ozone generators.

The oxygen booster of the present apparatus is used to increase the oxygen generator output pressure from 7 to 10 psi to an output pressure of between 60 psi and 165 psi. The output pressure selected depends upon the pressure required to inject the oxygen gas and any ozone gas through the diffuser 42 and into the pressurized sewage in mixing chamber 30 connected to force sewage main 32. An optional pressure monitor connected to a shut-off switch is provided which will send a signal to a remote monitoring station and will shut down the system should the booster or compressor 107 fail to meet the pre-selected output pressure.

The high-pressure oxygen produced by the oxygen-generator 103 and pressure booster or compressor 107 then is used as a supply gas steam for a high-pressure ozone generator 109. A suitable high-pressure ozone generator 109 for use in the present method and apparatus is manufactured by Plasma Technics, Inc., of Racine, Wis. The high-pressure ozone generator is able to produce ozone up to a maximum pressure of about 100 psi. This produced high-pressure ozone is added to the high-pressure, high-concentration oxygen stream where the overall gas pressure is sufficient to overcome the pressure of the forced main.

Referring now to FIG. 4, the construction of mixing chamber 30 and diffuser 42 will be described. As previously stated it is undesirable for a structure or device to be inserted into or projecting into a sewer force main 32. Sewage is notorious for containing solids and objects which can become snagged or lodged on any structure projecting into the sewer main. The mixing chamber 30 is designed to be external of the sewer main 32 and attached to the side or the bottom of the force main 32 by a one (1) inch stainless steel nipple and ball valve 40, 46. As previously described, the housing, including mixing chamber 30 containing the diffuser 42, is made of Schedule 80 polyvinylchloride (PVC) pipe. The mixing chamber 30, itself, is formed of clear Schedule 80 PVC tubing. The overall length of mixing chamber 30 including reservoir 34 and first end cap 36 and second end cap 38 is approximately 24 inches. However, the size may be varied according to the space available adjacent to the particular force main 32 to which the apparatus is to be connected.

The diffuser 42 is comprised of sintered stainless steel and has an overall length of approximately six (6) inches and a diameter of approximately one-half (½) inches. Diffuser 42 is inserted into second end cap 38 the body of the diffuser. Diffuser 42 receives the gas stream from line 111 (FIG. 6) and creates micro bubbles of oxygen or of a mixture of ozone and oxygen. The bubbles are approximately 2 microns in size. These fine bubbles enhance the dissolving of the ozone and oxygen into the liquid phase or sewage present in the mixing chamber 30. The released micro-bubbles of gas eliminate the formation and collection of large gas bubbles within mixing chamber 30 and accumulation of gas pockets along the top of the force main 32. This avoid a problem that is inherent to the introduction of gas into a liquid filled pipe which is the formation of gas pockets or bubbles at the top of the pipe and the movement of the gas pockets or bubbles through the pipe to a point where the gas pocket is released. In this case this would be at the end of the force main 32. In such a circumstance the introduced oxygen and oxygen and ozone gas would not be dissolved in the sewage to produce the desired effect on the anaerobic bacteria in the force main 32. The desired effect being the eradication or inactivation of the anaerobic bacteria by increasing the presence of ozone and oxygen to reduce or eliminate an environment conducive to the growth of the hydrogen sulfide producing bacteria. Further, the improved dissolving of the ozone and oxygen within the sewage greatly reduces the potential for corrosion within the force main caused by the presence of undissolved oxygen and ozone within the force main 32 and destruction of the pipe and equipment by hydrogen sulfide gas.

The present apparatus incorporates several relays that sequence the starting of the ozone generator 109 with respect to the operation of the oxygen generator 103 and pressure booster 107 and the detection of an oxygen gas stream of greater than 89% oxygen being supplied from these devices. In the event that either the oxygen generator 103 or the pressure booster 107 are not operating or should an oxygen gas stream of less that about 89% oxygen be detected, the high-pressure ozone generator 109 will not be started or will be shut down if already running. A direct current (DC) voltage adjustment control and DC voltage meter allow for control of the voltage applied to the ozone generator. An increase or decrease in the voltage applied to the ozone generator will provide a linear increase or decrease, respectively, in the amount of ozone produced.

The apparatus further includes an ambient ozone monitor detector. This device detects and measures any ozone present in the air in the vicinity of the area (i.e., the dry well or other housing) in which the apparatus is installed. If a concentration of ozone in excess of 0.3 ppm is detected, the monitor generates an alarm and shuts down the apparatus. The ozone level of 0.3 ppm was selected as this represents the Occupational Safety and Health Administration's 15 minute exposure level for ozone. In this manner if persons are in the area for maintenance, the proper level of safety precaution will be operating during such maintenance work.

Remote Alarm Terminal Connections are provided in the form of dry contacts which open or close in response to an alarm situation and provide an alert to the operator of the apparatus of the present invention. The remote alarms provided include, an oxygen concentration alarm that detects the concentration of oxygen being generated by the oxygen concentrators 103. The oxygen concentration alarm sends out an alarm when the oxygen concentration falls below 89% for a period of more than five (5) minutes. A suitable oxygen concentration monitor is manufactured by Compass Controls of Lenexa, Kans. The ozone generator 109 is provided with a cell operation relay to detect the presence of power being provided to the ozone generator 109. The relay will shut down the generator 109 upon detecting the absence of electrical power to ozone generator 109. An ambient ozone monitor is provided at the location where the ozone generator 109 is installed. A suitable ozone monitor is manufactured by Aeroqual of New Zealand. The ozone monitor will shut down the system if a concentration of 0.3 ppm ozone is detected in the atmosphere of the area around the apparatus. The oxygen booster pressure alarm is comprised of a pressure switch and is activated if the output pressure of the pressure booster falls below the selected pressure of between 40 psi and 165 psi. The output pressure switch is installed in line 111 (FIG. 6). Such output pressure switches are well known in the art. Also a system operation alarm is provided to detect whether the system is in operation. Such system operation alarms also are well known in the art. Each of these alarms, when activated, will cause the apparatus to be shut down.

The apparatus can be contained within one or two cabinet structures for convenient installation into most dry well structures. The apparatus operates on 120 volts or 240 volts alternating current and is air cooled. The apparatus can be wall or floor mounted within the dry well or pump room associated with force main 32. Ventilation of the area is required and should be at a rate of at least six (6) air changes per hour to avoid the cost of housing the apparatus in explosion proof components or housings as well as to allow proper operation of the oxygen generator and to provide adequate cooling of the system. It will be appreciated that the rate of air changes will be further dependent on the size of the area in which the apparatus is installed.

Again referring to FIG. 4, the operation of the mixing chamber 30 is as follows, the pressure present in force main 32 causes a portion of sewage to exit the force main 32 and enter take-off 40. The sewage portion then enters mixing chamber 30 and is subject to the injection of a pressurized ozone and gas mixture by diffuser 42. The pressure of the pressurized ozone and gas mixture is sufficient to overcome the pressure presented by the force main 32 and the ozone and gas mixture becomes dissolved in the sewage contained in mixing chamber 30. During the course of flow of the sewage within mixing chamber 30 a continuous exchange of sewage between force main 32 and mixing chamber 30 is constantly occurring. Due to the constant exchange sewage that has received the addition of the ozone and gas is reintroduced into force main 32 without the need for a separate return line into force main 32.

The diffuser 42 introduces gas bubbles of approximately two (2) microns in size into the liquid sewage within mixing chamber 30. The gas is introduced at a pressure of approximately 60 pounds per square inch (psi) or greater depending on the force main pressure. The introduction of the gas at pressures of 60 psi or greater allows a much higher transfer of the gas into the liquid. This increases the effectiveness and efficiency of the present apparatus and method in controlling the generation of hydrogen sulfide and anaerobic bacterial growth in the sewage force main by introduction of oxygen into the liquid sewage at an amount that is lethal to the survival of anaerobic bacteria. It is believed that the transfer of ozone and oxygen into the liquid sewage is as high as 90% or more.

The operation of the apparatus and method is immediately observable in instances in which the embodiment of the mixing chamber 30 is constructed from clear Schedule 80 polyvinylchloride (PVC) pipe. In such an embodiment of mixing chamber 30 the liquid sewage introduced into the mixing chamber 30 is a dark colored liquid. Upon the injection of the ozone via the diffuser the color of the liquid sewage within the clear PVC mixing chamber rapidly clears sufficiently to allow the observer to see through the mixing chamber to the opposite side of the mixing chamber 30.

In the foregoing description, certain terms have been used for brevity, clearness and understanding; but no unnecessary limitations are to be implied therefrom beyond the requirements of the prior art, because such terms are used for descriptive purposes and are intended to be broadly construed. Moreover, the description and illustration of the inventions is by way of example, and the scope of the inventions is not limited to the exact details shown or described.

Certain changes may be made in embodying the above invention, and in the construction thereof, without departing from the spirit and scope of the invention. It is intended that all matter contained in the above description and shown in the accompanying drawings shall be interpreted as illustrative and not meant in a limiting sense.

Having now described the features, discoveries and principles of the invention, the manner in which the method and apparatus of ozone injection into sewage forced main is constructed and used, the characteristics of the construction, and advantageous, new and useful results obtained; the new and useful structures, devices, elements, arrangements, parts and combinations, are set forth in the appended claims.

It is also to be understood that the following claims are intended to cover all of the generic and specific features of the invention herein described, and all statements of the scope of the invention which, as a matter of language, might be said to fall therebetween.

Having thus described the invention what is claimed as new and desired to be secured by Letters Patent is as follows:

1. A method of treating a pipe containing sewage under pressure to eliminate the generation of hydrogen sulfide therein, the sewage in the pipe being under pressure from a pump connected to the pipe, the pump intermittently operating to place the sewage in the pipe downstream of the location of the pump on the pipe under pressure, the method comprising the steps of:

attaching a mixing chamber to the pressurized pipe at a location downstream of the pump, said mixing chamber having a diffuser within said mixing chamber, providing a source of pressurized ozone gas connected to said diffuser, providing a source of pressurized high concentration oxygen gas connected said diffuser, allowing a portion of the sewage to flow from the sewage pipe into said mixing chamber, determining if the pump is pumping sewage, injecting said pressurized high concentration oxygen gas into said diffuser when the pump is not pumping, injecting a mixture of approximately 3-5% ozone and said pressurized high concentration oxygen gas into said diffuser when the pump is pumping, determining the hydrogen sulfide concentration in the sewage pipe to provide a determined hydrogen sulfide concentration, and terminating said step of injecting a mixture of approximately 3-5% ozone and said pressurized high concentration oxygen gas into said diffuser during periods when the pump is operating if said determined hydrogen sulfide concentration is zero parts-per-million.

2. The method as claimed in claim 1 wherein said pressurized high concentration oxygen gas concentration is between approximately 89% and approximately 95% percent by weight.

3. The method as claimed in claim 1 wherein said pressurized high concentration oxygen gas concentration is between approximately 50% and approximately 95% percent by weight.

4. The method as claimed in claim 1 further comprising the steps of:

analyzing for the hydrogen sulfide concentration in the sewage pipe to provide an analyzed hydrogen sulfide concentration at a time after the step of injecting a mixture of approximately 3-5% ozone and said pressurized high concentration oxygen gas into said diffuser when the pump is operating has been terminated, and restarting the step of injecting a mixture of approximately 3-5% ozone and said pressurized high concentration oxygen gas into said diffuser when the pump is operating if said analyzed hydrogen sulfide concentration is greater than zero parts-per-million.

5. The method as claimed in claim 1 wherein the pressurized high concentration oxygen gas is at a pressure greater than the pressure of the sewage in the pipe.

6. The method as claimed in claim 1 wherein the ozone gas is at a pressure greater than the pressure of the sewage in the pipe.

7. The method as claimed in claim 1 further comprising the step of periodically exposing said diffuser to a sufficient volume of said ozone gas to clean said diffuser during periods of time when step of injecting a mixture of approximately 3-5% ozone and said pressurized high concentration oxygen into said diffuser during periods when the pump is operating is terminated.

8. The method as claimed in claim 1 wherein said determined hydrogen sulfide concentration is zero parts-per-million for approximately 48 hours before terminating said step of injecting a mixture of approximately 3-5% ozone and pressurized high concentration oxygen into said diffuser during periods when the pump is operating.

* * * * *